United States Patent
Zheng et al.

(10) Patent No.: US 8,279,593 B2
(45) Date of Patent: Oct. 2, 2012

(54) HARD DISK RETENTION ASSEMBLY AND ELECTRONIC DEVICE UTILIZING THE SAME

(75) Inventors: Jun-Jie Zheng, Shenzhen (CN); Yan Zhong, Shenzhen (CN); Xin Ji, Shenzhen (CN); Wen-Hsiang Hung, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 242 days.

(21) Appl. No.: 12/781,992

(22) Filed: May 18, 2010

(65) Prior Publication Data

US 2011/0235267 A1  Sep. 29, 2011

(30) Foreign Application Priority Data

Mar. 23, 2010  (CN) .......................... 2010 1 0130470

(51) Int. Cl.
*G06F 1/16* (2006.01)
*A47B 81/00* (2006.01)
*A47F 7/00* (2006.01)

(52) U.S. Cl. ......... 361/679.33; 361/679.37; 361/679.21; 312/223.1; 312/223.2; 211/26

(58) Field of Classification Search .......... 361/724–727, 361/679.01–679.44, 679.55–679.59; 312/223.1, 312/223.2; 211/26
See application file for complete search history.

(56) References Cited

U.S. PATENT DOCUMENTS

| | | | | |
|---|---|---|---|---|
| 4,941,841 A * | 7/1990 | Darden et al. | ........... | 361/679.39 |
| 5,155,662 A * | 10/1992 | I-Shou | ........... | 361/679.31 |
| 5,187,643 A * | 2/1993 | I-Shou | ........... | 361/679.37 |
| 6,646,871 B1 * | 11/2003 | Liao et al. | ........... | 361/679.36 |
| 6,954,353 B2 * | 10/2005 | Olson et al. | ........... | 361/679.33 |
| 7,839,629 B2 * | 11/2010 | Yeh | ........... | 361/679.37 |
| 2002/0043908 A1 * | 4/2002 | Gan | ........... | 312/223.2 |
| 2002/0135975 A1 * | 9/2002 | Schmidt | ........... | 361/681 |
| 2003/0038566 A1 * | 2/2003 | Qiu | ........... | 312/223.2 |
| 2003/0063434 A1 * | 4/2003 | Huang | ........... | 361/683 |
| 2003/0090864 A1 * | 5/2003 | Kuo | ........... | 361/683 |
| 2008/0158802 A1 * | 7/2008 | Tsuchida | ........... | 361/681 |
| 2008/0259554 A1 * | 10/2008 | Qin et al. | ........... | 361/685 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A retention assembly for securing a hard disk to a frame of an electronic device, the retention assembly includes a bracket and a connector. The bracket is fixed to the hard disk. One of the frame and the bracket defining a guide groove, the other one forming a slide rail slidably received in the guide groove. The connector fixed to the frame and adjacent to the guide groove or the slide rail. The hard disk is electrically connected or disconnected to the connector by sliding the bracket along the guide groove or the slide rail.

16 Claims, 3 Drawing Sheets

HARD DISK RETENTION ASSEMBLY AND ELECTRONIC DEVICE UTILIZING THE SAME

BACKGROUND

1. Technical Field

The present disclosure relates in general to retention assemblies, and particularly, to a retention assembly for a hard disk and an electronic device utilizing the retention assembly.

2. Description of Related Art

Electronic devices such as desktop computers or servers, usually include data storage, such as hard disks, to increase the functionality of the electronic device.

A typical electronic device includes a frame and a hard disk secured on the frame by fasteners, electrically connected to other electronic components such as a motherboard, by cables. However, it is often time-consuming and laborious to replace the hard disk, because the cables connected to the hard disk must be unplugged and then reconnected.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
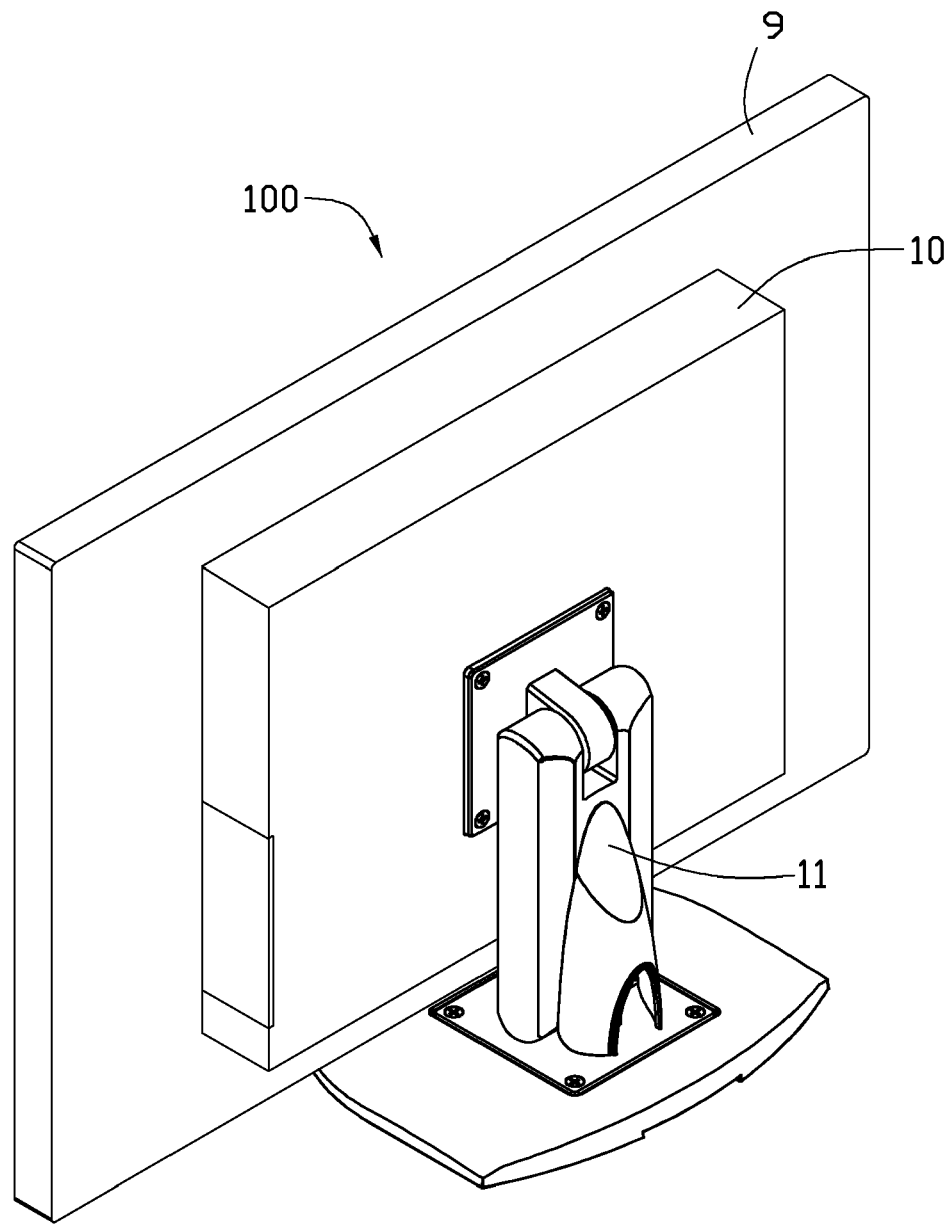
FIG. 1 is an isometric view of an exemplary embodiment of an electronic device including a host.

Referring to FIG. 1, an exemplary embodiment of the electronic device 100 includes a host 10, and a supporting mechanism 20 supporting the host 10. In the illustrated embodiment, the electronic device 100 is an all-in-one computer.

Figure 2:
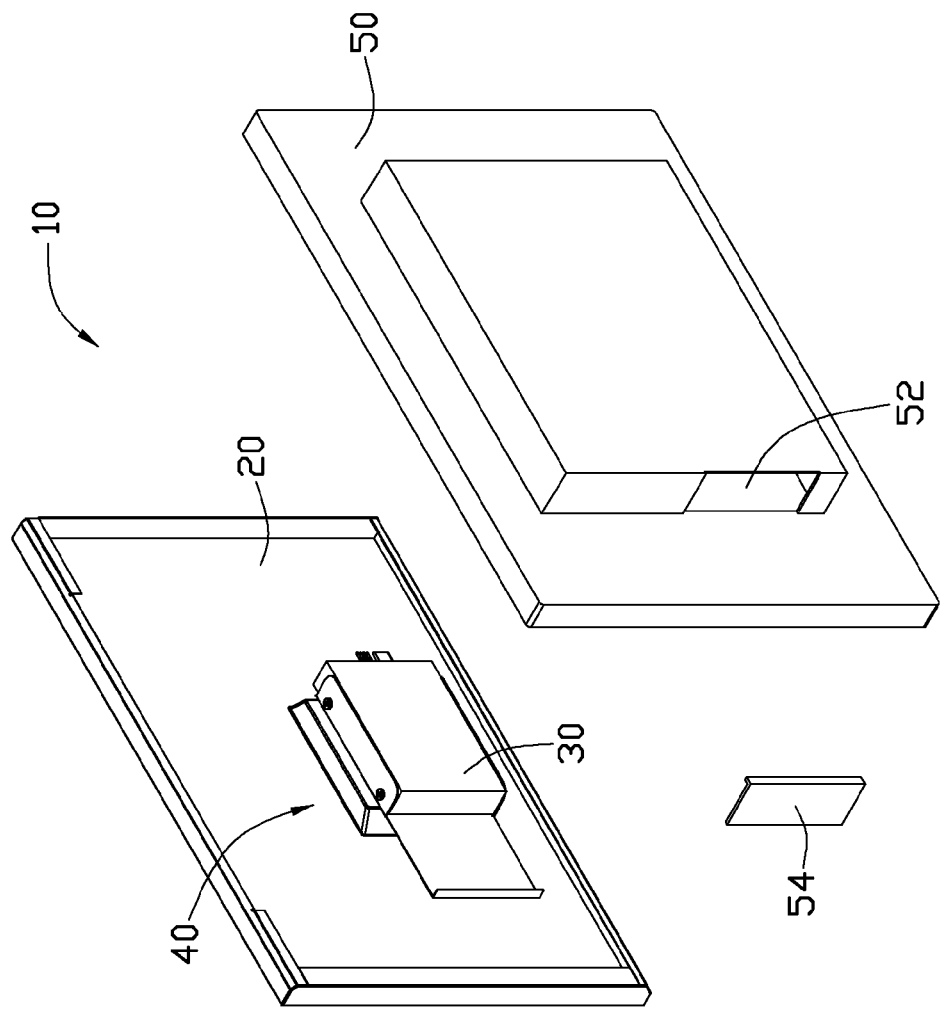
FIG. 2 is a partial, exploded, isometric view of the host of FIG. 1, the host including a hard disk retention assembly.

Referring to FIG. 2, the host 10 includes a frame 20, a hard disk 30, a retention assembly 40, and a housing 50 for accommodating the components.

The frame 20 is substantially a flat plate on a side of which the hard disk 30 and the retention assembly 40 are located. The electronic device 100 further includes a motherboard (not shown) fixed to the side of the frame 20 and electrically connected to the hard disk 30, and a display device 9 (see FIG. 1) fixed to the other side of the frame 20 electrically connected to the motherboard.

Figure 3:
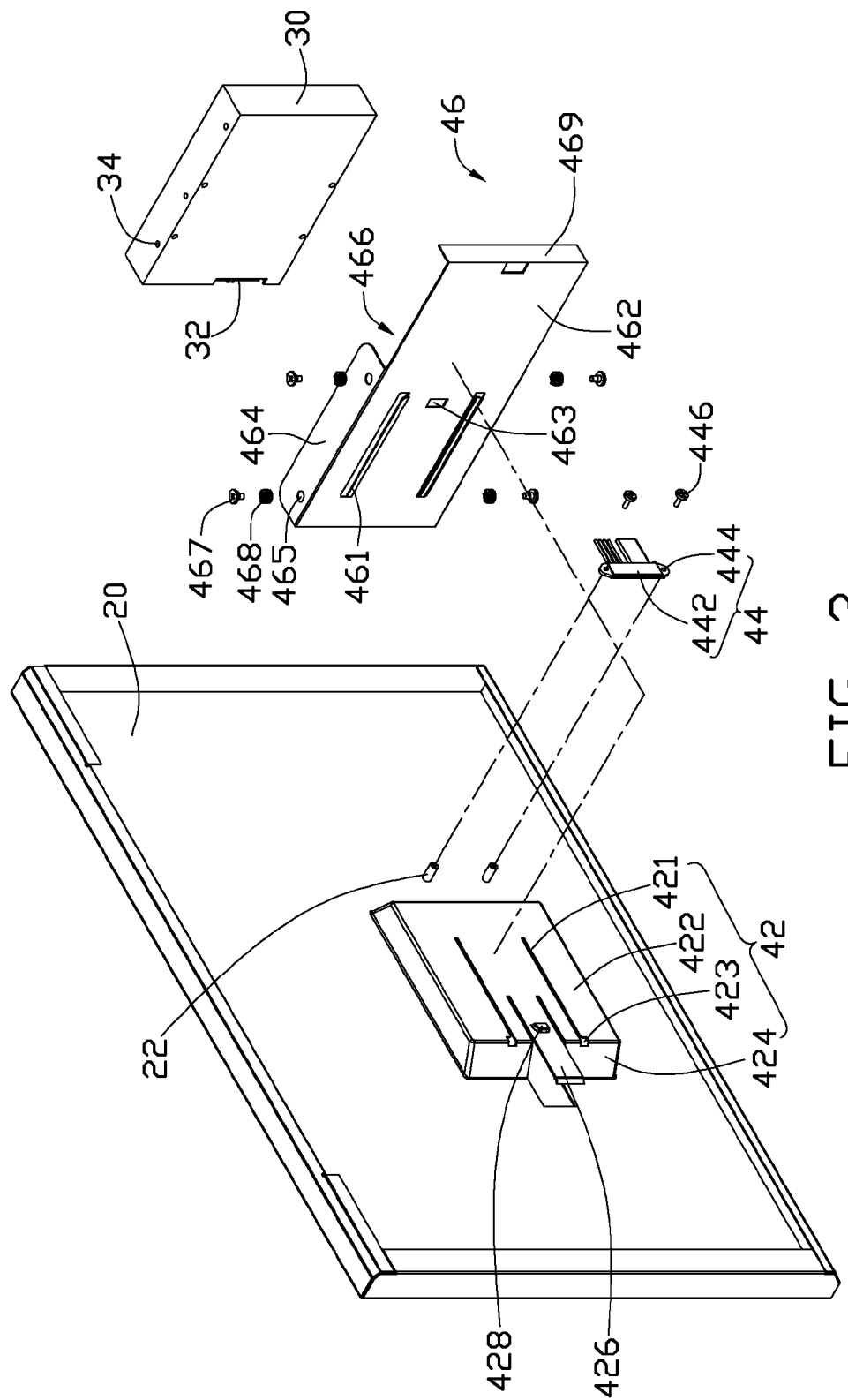
FIG. 3 is another partial, exploded, isometric view of the host of FIG. 2.

Referring to FIG. 3, the retention assembly 40 includes a mounting stand 42, a connector 44 and a bracket 46. The mounting stand 42 is disposed on the side of the frame 20 in the form of a depression towards the interior of the housing 50. The connector 44 is fixed to the frame 20 adjacent to the mounting stand 42. The bracket 46 is fixed to the hard disk 30, and slidably attached to the mounting stand 42.

The mounting stand 42 includes a supporting plate 422, and side plates 424 extending from sides of the supporting plate 422 towards the frame 20. The supporting plate 422 defines at least one, but preferably two parallel guide grooves 421. One of the side plates 424 spaced from the connector 44 defines two notches 423 communicating with the corresponding guide groove 421. The supporting plate 422 further includes an elastic latch portion 426 extending outwards from a portion of the side plate 424 between the two guide grooves 421. An end of the elastic latch portion 426 is capable of moving relative to the mounting stand 42 by resilient force. A positioning protrusion 428 is disposed in the center of the elastic latch portion 426.

The hard disk 30 includes an interface 32 formed at one end, and a plurality of fixing holes 34 defined on opposite sides of the hard disk 30.

The connector 44 includes a slot 442 to couple to the interface 32 of the hard disk 30, and is electrically connected to the motherboard by cables (not shown). The connector 44 defines fixing holes 444 on opposite ends of the connector 44. The frame 20 forms fixing columns 22 adjacent to the mounting stand 42. Each of the fixing columns 22 defines a threaded hole (not labeled) along its axis. The retention assembly 40 further includes fasteners 446 passing through the two fixing holes 444, and received in the threaded holes of the fixing columns 22, to fix the connector 44 to the frame 20.

The bracket 46 includes a base plate 462 having side plates 464 extending from sides of the base plate 462. The base plate 462 and the side plates 464 cooperatively define a cavity 466 for receiving the hard disk 30. The base plate 462 forms substantially parallel slide rails 461 slidably received in the guide grooves 421. In the illustrated embodiment, the slide rails 461 are L-shaped and face each other. Each slide rail 461 extends outwards from a side of the base plate 462, such that the bracket 46 can be firmly attached to the mounting stand 42. The base plate 462 defines a positioning hole 463 to elastically receive the positioning protrusion 428 of the elastic latch portion 426. The base plate 462 further forms a handle portion 469 extending substantially perpendicular to an end of the base plate 462 to provide ease of pulling or pushing. Each side plate 464 defines a plurality of through holes 465 aligned with the fixing holes 34 of the hard disk 30. The retention assembly 40 further includes a plurality of fasteners 467 and a plurality of elastic washers 468. The plurality of elastic washers 468, which may be made of rubber, are positioned inside the through holes 465, respectively. The fasteners 467 pass through the elastic washers 468, and are received in the corresponding fixing holes 34, such that the hard disk 30 is fixed to the hard disk bracket 60. The elastic washer 468 is capable of absorbing shock from the exterior so as to improve a working stability of the hard disk 30.

Referring to FIG. 2 again, the housing 50 defines an opening 52 corresponding to the hard disk 30. The hard disk 30 can be taken out from the host 10 by the opening 52. The housing 50 includes a cover 54 to seal the opening 52.

In assembly, the hard disk 30 is secured in the cavity 466 of the bracket 46 by the fasteners 467, and then is pushed into the housing 50 through the opening 52. When the bracket 46 contacts the mounting stand 42, the slide rails 461 enter the guide grooves 421 by passing through the notches 423. When the slide rails 461 reach two ends of the guide grooves 421, the interface 32 of the hard disk 30 is received in the slot 442 of the connector 44, such that the hard disk 30 is electrically connected to the connector 44. Then, the positioning protrusion 428 is received in the positioning hole 463, to restrict the movement of the bracket 46 relative to the mounting stand 42.

When disassembling the hard disk 30, the cover 54 is removed from the housing 50. The bracket 46 slides along the slide rails 461 by pulling the handle portion 469, such that the hard disk 30 is disconnected from the connector 44, and the hard disk 30 is removed from the housing 50 through the opening 52.

In the electronic device 100, the hard disk 30 is electrically connected or disconnected to the connector 44 by sliding the bracket 46. Thus, it is not necessary to perform unduly time-consuming and laborious unplugging or inserting of the cables during the replacement of the hard disk 30.

The cover 54, the elastic washers 468, the positioning protrusion 428, the positioning hole 463, and the handle portion 469 may be omitted. The slide rails 461 may be formed on the frame 20, while the guide grooves 421 are defined on the bracket 46. The number of the slide rails 461 or the guide grooves 421 may be one or more than two.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A retention assembly for removably securing a hard disk to a frame of an electronic device, the retention assembly comprising:
   a mounting stand disposed on the frame and comprising an elastic latch portion extending outwards from a first end of the mounting stand;
   a bracket fixed to the hard disk and slidably attached to the mounting stand, one of the mounting stand and the bracket defining at least one guide groove, and the other of the mounting stand and the bracket forming at least one slide rail slidably received in the at least one guide groove; and
   a connector fixed to the frame and positioned adjacent to an opposite second end of the mounting stand to align with the corresponding hard disk;
   wherein the hard disk is electrically connected or disconnected to the connector by sliding the bracket along the at least one guide groove or the at least one slide rail; the mounting stand further comprises a positioning protrusion formed on the elastic latch portion, the bracket defines a positioning hole to elastically receive the positioning protrusion of the elastic latch portion, thereby restricting a movement of the bracket relative to the mounting stand.

2. The retention assembly of claim 1, wherein the mounting stand is disposed on a side of the frame, the guide groove is defined on the mounting stand, the slide rail is formed on the bracket.

3. The retention assembly of claim 2, wherein there are two slide rails and each slide rail extends from a side of the bracket and the slide rails face each other.

4. The retention assembly of claim 2, wherein the mounting stand comprises a supporting plate and a side plate extending from an end thereof away from the connector; and the side plate defines a notch communicating with the guide groove to allow the slide rail to be received in the guide groove.

5. The retention assembly of claim 4, wherein the bracket comprises a base plate, and side plates extending from the base plate, the base plate and the side plates cooperatively defining a cavity to receive the hard disk.

6. The retention assembly of claim 5, wherein the hard disk defines a fixing hole, the bracket defines a through hole aligned with the fixing hole; and the retention assembly further comprises an elastic washer positioned inside the through hole and a fastener received in the fixing hole after passing through the elastic washer.

7. The retention assembly of claim 5, wherein the bracket comprises a handle portion extending sideward from the base plate.

8. An electronic device, comprising:
   a frame;
   a hard disk having an interface;
   a retention assembly for removably securing the hard disk to the frame; the retention assembly comprising:
      a mounting stand disposed on the frame and comprising an elastic latch portion extending outwards from a first end of the mounting stand;
      a bracket fixed to the hard disk and slidably attached to the mounting stand; one of the mounting stand and the bracket defining at least one guide groove, the other of the mounting stand and the bracket forming at least one slide rail slidably received in the guide groove; and
      a connector fixed to the frame and positioned adjacent to an opposite second end of the mounting stand to align with the corresponding interface of the hard disk;
      wherein the hard disk is electrically connected or disconnected to the connector by sliding the bracket along the at least one guide groove or the at least one slide rail; the mounting stand further comprises a positioning protrusion formed on the elastic latch portion, the bracket defines a positioning hole to elastically receive the positioning protrusion of the elastic latch portion, thereby restricting a movement of the bracket relative to the mounting stand.

9. The electronic device of claim 8, further comprises a housing to receive the frame, the housing defining an opening for removal or insertion of the hard disk.

10. The electronic device of claim 9, wherein the housing includes a cover for the opening.

11. The electronic device of claim 8, wherein the mounting stand is disposed on a side of the frame, the guide groove is defined on the mounting stand, the slide rail is formed on the bracket.

12. The electronic device of claim 11, wherein there are two slide rails and each slide rails extends from a side of the bracket and the slide rails face each other.

13. The electronic device of claim 11, wherein the mounting stand comprises a supporting plate and a side plate extending from an end thereof away from the connector; the side plate defines a notch communicating with the guide groove to allow the slide rail to be received in the guide groove.

14. The electronic device of claim 13, wherein the bracket comprises a base plate, and two side plates extending from the base plate, the base plate and the two side plates cooperatively define a cavity to receive the hard disk.

15. The electronic device of claim 14, wherein the hard disk defines a fixing hole, the bracket defines a through hole aligned with the fixing hole; and the retention assembly further comprises an elastic washer positioned inside the through hole and a fastener received in the fixing hole after passing through the elastic washer.

16. The electronic device of claim 14, wherein the bracket comprises a handle portion extending sideward from the base plate.

* * * * *